US007376423B2

(12) United States Patent
Sakanaba

(10) Patent No.: US 7,376,423 B2
(45) Date of Patent: May 20, 2008

(54) MOBILE COMMUNICATION DEVICE CAPABLE OF NOTIFYING USER WHEN DEVIATING FROM A PREDETERMINED AREA

(75) Inventor: Takayuki Sakanaba, Tokyo (JP)

(73) Assignee: NEC Corporation, Tokyo (JP)

( * ) Notice: Subject to any disclaimer, the term of this patent is extended or adjusted under 35 U.S.C. 154(b) by 401 days.

(21) Appl. No.: 10/299,704

(22) Filed: Nov. 20, 2002

(65) Prior Publication Data

US 2004/0203769 A1   Oct. 14, 2004

(30) Foreign Application Priority Data

Nov. 28, 2001   (JP)   ............... 2001-362726

(51) Int. Cl.
  *H04Q 7/20* (2006.01)
(52) U.S. Cl. ............... 455/435.1; 455/432.1; 455/426.1; 340/426.19
(58) Field of Classification Search ............ 455/421, 455/432.1, 435.1, 435.2, 426.1, 462, 436, 455/437, 440, 441, 517, 426.2, 550.1, 458; 340/430, 426.18, 426.19, 426.22, 426.2, 340/539.1, 539, 539.12, 539.13, 539.15, 340/236.2, 428.18
See application file for complete search history.

(56) References Cited

U.S. PATENT DOCUMENTS

| 4,853,951 | A | * | 8/1989 | Bauer ..................... 455/421 |
|---|---|---|---|---|
| 5,373,548 | A | * | 12/1994 | McCarthy ................. 455/462 |
| 5,444,765 | A | * | 8/1995 | Marui et al. .............. 455/432.1 |
| 5,450,613 | A | * | 9/1995 | Takahara et al. ........... 455/517 |
| 5,457,810 | A | * | 10/1995 | Ivanov et al. ............. 455/441 |
| 5,617,468 | A | * | 4/1997 | Nojima et al. ............. 455/421 |
| 5,642,398 | A | * | 6/1997 | Tiedemann et al. ......... 455/426.1 |
| 5,839,063 | A |  | 11/1998 | Lee |
| 5,845,213 | A | * | 12/1998 | Sumner et al. ............. 455/458 |
| 5,918,159 | A | * | 6/1999 | Fomukong et al. .......... 340/7.21 |
| 6,002,334 | A | * | 12/1999 | Dvorak .................... 340/568.1 |
| 7,085,257 | B1 | * | 8/2006 | Karves et al. ............. 370/352 |

FOREIGN PATENT DOCUMENTS

| EP | 0 413 963 A2 | * | 2/1991 |
|---|---|---|---|
| EP | 0 897 119 A2 |  | 2/1999 |

(Continued)

OTHER PUBLICATIONS

Japanese Patent Application No. 2000-69537, published Mar. 3, 2000 (Abstract only).

(Continued)

*Primary Examiner*—Charles N. Appiah
*Assistant Examiner*—Nghi H. Ly
(74) *Attorney, Agent, or Firm*—Sughrue Mion, Pllc.

(57) ABSTRACT

When an operational mode of a mobile terminal is set to a memory mode, the location information of an area of a base station as a contacted party is registered. When the operational mode of a mobile terminal is set to a notification mode, a determination is made whether the base station as a contacted party is a base station in an unregistered area which is not registered into the storage means. Then, when the contacted party is the base station in the unregistered area, any deviation from an activity range is sent to a registered contact. This can automatically transmit any deviation from the normal activity range.

4 Claims, 5 Drawing Sheets

FOREIGN PATENT DOCUMENTS

| | | | |
|---|---|---|---|
| JP | 10-143788 A | | 5/1988 |
| JP | 8-9450 A | | 1/1996 |
| JP | H09-135474 A | | 5/1997 |
| JP | 10-143788 | * | 5/1998 |
| JP | 11-234736 A | | 8/1999 |
| JP | 2001-014592 | * | 1/2001 |
| JP | 2001-14592 A | | 1/2001 |
| JP | 2001-157266 A | | 6/2001 |
| WO | WO 96/41488 A1 | | 12/1996 |

OTHER PUBLICATIONS

Japanese Patent Application No. 11-98573, published Apr. 9, 1999 (Abstract only).

Japanese Patent Application No. 7-38959, published Feb. 7, 1995 (Abstract only).

Japanese Patent Application No. 2002-99971, published Apr. 5, 2002 (Abstract only).

* cited by examiner

MOBILE COMMUNICATION DEVICE CAPABLE OF NOTIFYING USER WHEN DEVIATING FROM A PREDETERMINED AREA

BACKGROUND OF THE INVENTION

1. Field of the Invention

The present invention relates to a mobile communication device, e.g., a cellular phone, and to a mobile communication system using the mobile communication device. More specifically, the present invention relates to a mobile communication device having an automatic transmission function when the mobile communication device deviates from a predetermined activity range. Moreover, the present invention relates to a mobile communication system having an automatic transmission function when a mobile communication device deviates from a predetermined activity range.

2. Description of the Related Art

A location information system using a cellular phone is described in Japanese Laid-Open Patent Application Heisei 8-9450. In the location information system, a terminal device moving between base stations receives a signal transmitted from the base stations and outputs a location information signal indicating the reception thereof, thereby registering the location information signal into a common database. When a search requester searches for the terminal device, the location information of the terminal device is read from the common database and is sent to the search requester.

In the location information system, the search requester must initiate the search request when he/she desires to know the location information of the terminal device. In addition, since the location information of the terminal device is read after the search request is received from the search requester, it takes time to obtain the location information of the terminal device. When a terminal device is lost or stolen or the owner of the terminal device is missing or kidnapped, a delay in obtaining the location information is an important problem.

SUMMARY OF THE INVENTION

The present invention has been accomplished to solve the above-described problems experienced by the related art. Thus, an aspect of the present invention is to provide a mobile communication device that automatically transmits a message when there is deviation from a registered activity range. In addition, an aspect of the present invention is to provide a mobile communication system that automatically transmits a message when there is deviation from a registered activity range of a mobile communication device.

To solve the above mentioned problem, a mobile communication device comprises registering means for registering area information about area that includes a base station, and storing means for storing information about an apparatus. The mobile communication device further comprises judging means for judging whether or not the mobile communication device is in a registered area in the registering means. The mobile communication device further comprises notifying means for notifying deviation from the registered area to the apparatus when it is judged that the mobile communication device is not in the registered area. The notifying means sends a current location information of the mobile communication device to the apparatus at the same time. The mobile communication device further comprises a counting means for counting time while the mobile communication device stays in an unregistered area. The notifying means may notify the apparatus about a deviation from the registered area when the counted time reaches a predetermined time. The registering means registers area information about new area if the area information is not registered into the registering means when the counted time reaches a predetermined time. The mobile communication device further comprises a sending means for sending back the current location information upon inquiry from a specified party. Preferably, the mobile communication device is a portable telephone. Moreover, the mobile communication device of the present invention further comprises a counting means for counting time when the mobile communication device cannot contact with a base station. The notifying means notifies the apparatus of a deviation from the registered area when the counted time reaches a predetermined time. The mobile communication device further comprises a calculating means for calculating a time interval during which a handover occurs between base stations. The notifying means notifies the apparatus for a deviation from the registered area when the time is over a predetermined time. The notifying means does not notify the apparatus for a deviation from the registered area when the time is below a predetermined time. The mobile communication device further comprises a calculating means for calculating a moving speed based on the size of the area and the location information from the base station. The notifying means notifies the apparatus for a deviation from the registered area when the time is over a predetermined time. The notifying means does not notify the apparatus for a deviation from the registered area when the time is below a predetermined time.

Another aspect of the present invention provides a mobile communication device comprises a registering circuit that registers area information about area that includes a base station, and a storing circuit that stores information about an apparatus. The present invention further provides a judging circuit that judges whether or not the mobile communication device is in a registered area in the registering circuit. The present invention further provides a notifying circuit that notifies deviation from the registered area to the apparatus when it is judged that the mobile communication device is not in the registered area. The notifying circuit sends a current location information of the mobile communication device to the apparatus at the same time. The mobile communication device further comprises a counter that counts time while the mobile communication device stays in an unregistered area. The notifying circuit notifies the apparatus about a deviation from the registered area when the counted time reaches a predetermined time. The registering circuit registers area information about new area when the counted time reaches a predetermined time. The mobile communication device further comprises a sending circuit that sends back the current location information upon inquiry from a specified party. The mobile communication device is preferably a portable telephone. The mobile communication device further comprises a counter that counts time while the mobile communication device cannot contact with a base station. The notifying circuit notifies the apparatus about a deviation from the registered area when the counted time reaches a predetermined time. The mobile communication device further comprises a calculator that calculates a time interval during which a handover occurs between base stations. The notifying circuit notifies the apparatus about a deviation from the registered area when the time is over a predetermined time. The notifying circuit does not notify the apparatus about a deviation from the registered area when the time is below a predetermined time.

The mobile communication device further comprises a calculator that calculates a moving speed based on the size of the area and the location information from the base station. The notifying circuit notifies the apparatus about a deviation from the registered area when the time is over a predetermined time. The notifying circuit does not notify the apparatus about a deviation from the registered area when the time is below a predetermined time.

The present invention further provides a base station comprising a registering means for registering identification information of a mobile communication device, and a storing means for storing information about an apparatus. The base station further comprises a judging means for judging whether or not the identification information of the mobile communication device is registered into the registering means. The base station further comprises a notifying means for notifying deviation from an activity range to the apparatus when the identification information of the mobile communication device is not registered into the registering means. The notifying means sends current location information of the mobile communication device to the apparatus at the same time. The base station further comprises a counting means for counting time while the mobile communication device stays in an area covered by the base station when the identification information of the mobile communication device is not registered into the registering means. The notifying means notifies the apparatus of a deviation from the activity range when the time reaches a predetermined time. The registering means registers the identification information of the mobile communication device if the identification information is not registered into the registering means when the time reaches a predetermined time. The base station further comprises sending means for sending the current location information of the mobile communication device upon inquiry from a specified party. The mobile communication device is preferably a portable telephone.

Alternatively, the present invention provides a base station comprising a registering circuit that registers identification information of a mobile communication device, and a storing circuit that stores information about an apparatus. The base station further comprises a judging circuit that judges whether or not the identification information of the mobile communication device is registered into the registering circuit, and a notifying circuit that that notifies deviation from an activity range to the apparatus when the identification information of the mobile communication device is not registered into the registering circuit. The notifying circuit sends a current location information of the mobile communication device to the apparatus at the same time. The base station further comprises a counter that counts time while the mobile communication device stays in an area covered by the base station when the identification information of the mobile communication device is not registered into the registering circuit. The notifying circuit notifies the apparatus of a deviation from the activity range when the counted ime reaches a predetermined time. The registering circuit registers the identification information of the mobile communication device if the identification information is not registered into the registering circuit when the counted time reaches a predetermined time. The base station further comprises a sending circuit that sends the current location information of the mobile communication device upon inquiry from a specified party. The mobile communication device is preferably a portable telephone.

The present invention also provides a method for notifying an apparatus about a deviation from a predetermined area. The method comprises registering area information about the predetermined area that includes a base station, and storing information about an apparatus. The method further comprises judging whether or not a mobile communication device is in the predetermined area, and notifying the apparatus of a deviation from the predetermined area when it is judged that the mobile communication device is not in the predetermined area. The method for notifying deviation from a predetermined area further comprises sending a current location information of the mobile communication device to the apparatus. The method for notifying the apparatus of a deviation from a predetermined area further comprises counting time while the mobile communication device stays in a predetermined area and notifying the apparatus of a deviation from the predetermined area when the counted time reaches a predetermined time. The method for notifying deviation from a predetermined area further comprises judging whether or not the area information of the base station that the mobile communication terminal contacts with has already registered, and registering area information about new area if the area information is not registered when the time reaches a predetermined time. The method for notifying deviation from a predetermined area further comprises sending back the current location information upon inquiry from a specified party. The mobile communication device is preferably a portable telephone.

According to the present invention, when moving to the unregistered area, deviation from the activity range is notified automatically. The person who receives the notification can find that the cellular phone user is located in a cell different from the normal life space and can check whether he/she is safe or not by a return mail or phone. When an emergency state such as loss/stealing or kidnapping/missing is caused, a quick response can be made.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE INVENTION

Hereinafter, each embodiment of the present invention will be described in detail with reference to the drawings.

Figure 1:
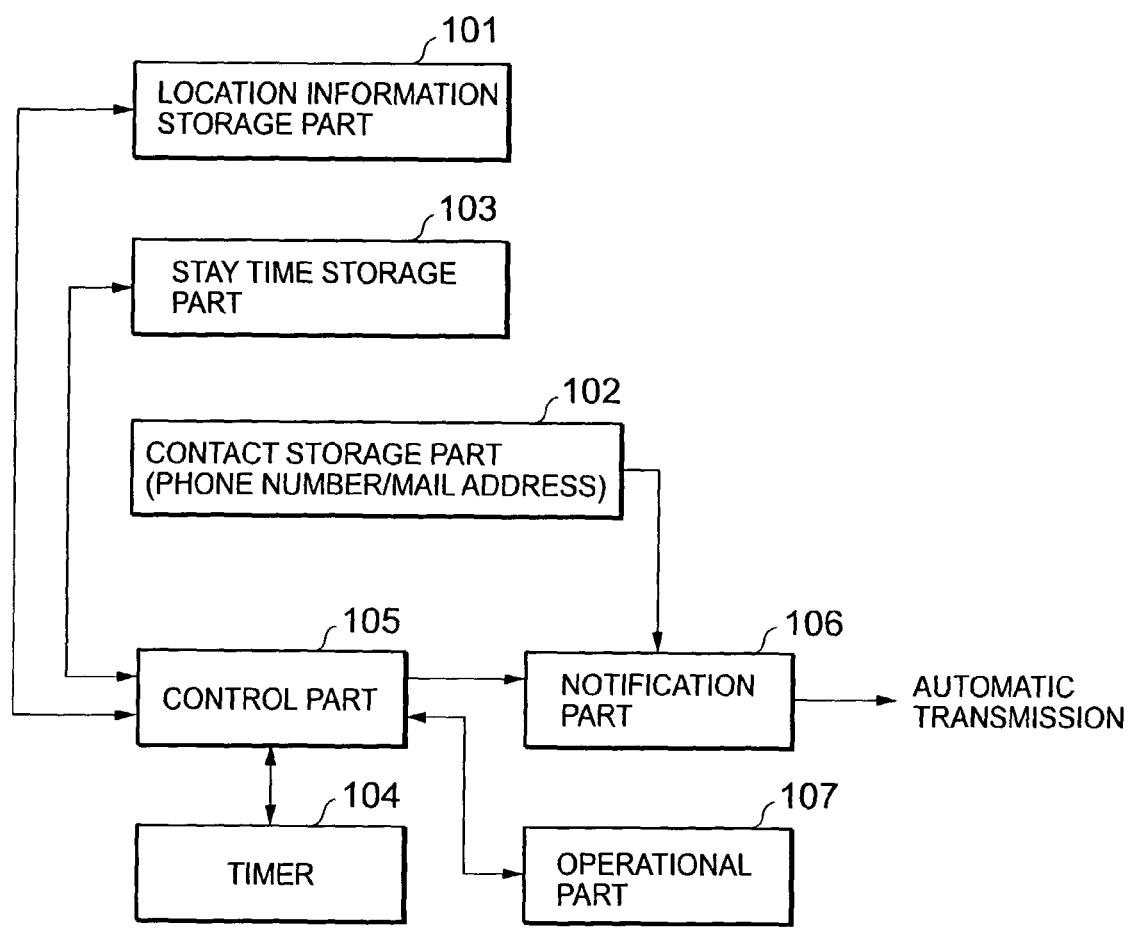
FIG. 1 is a block diagram showing an embodiment of a mobile communication device according to the present invention.

FIG. 1 is a block diagram showing an embodiment of a mobile communication device of the present invention. In this embodiment, the mobile communication device will be described by using a cellular phone as an example. In the drawing, the numeral 101 denotes a location information storage part storing the identification information (location information) from a base station as a normal activity range (a cell of the base station). The numeral 102 denotes a contact storage part storing a registered contact such as a phone number/mail address. The numeral 103 denotes a stay time storage part storing a cell stay time of a cellular phone/cellular phone user. The numeral 104 denotes a timer. The numeral 105 denotes a control part that controls the device. The numeral 106 denotes a notification part that notifies when there is deviation from the activity range to the phone number stored into the contact storage part 103. The numeral 107 denotes an operational part. In FIG. 1, circuits and mechanisms such as a radio transmitter and receiver for radio signals, an antenna, a microphone, a speaker and a liquid crystal display are omitted.

Figure 2:
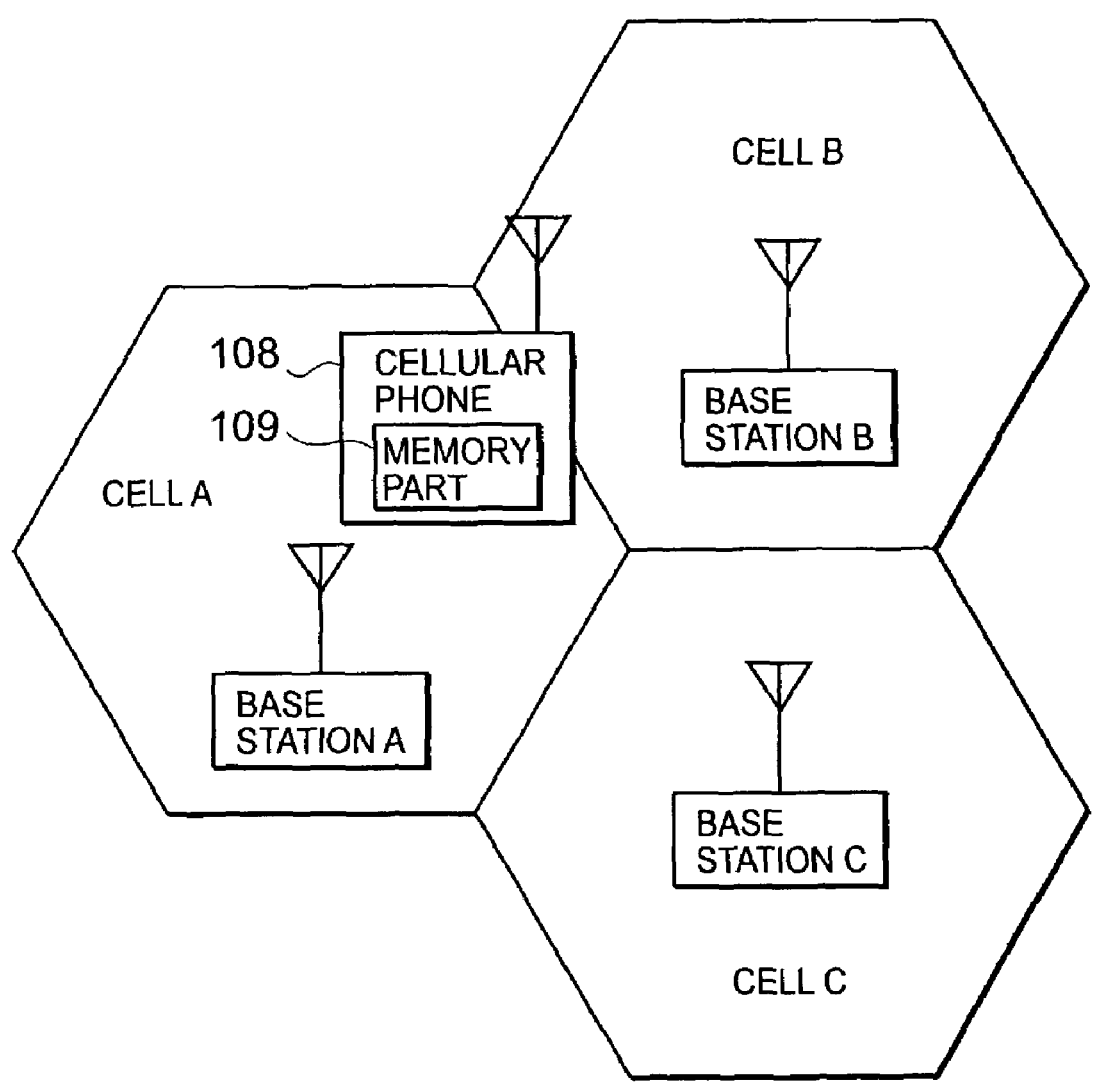
FIG. 2 is a diagram showing an example of a base station and cell distribution.

FIG. 2 is a diagram showing an example of a base station and cell distribution. In FIG. 2, cells A, B and C are areas handled by base stations A, B and C, respectively. A cellular phone 108 typically performs location registration as an optimum radio phone contacted party into any one of the base stations A, B or C based on the result obtained by measuring an electric field intensity determined in proportion to distance. In general, the base stations have identification information (location information) inherent therein and a cellular phone can specify an approximate location (cell) upon reception of the identification information. The numeral 109 denotes a memory part and the location information storage part 101, the contact storage part 102, and the stay time storage part 103 in the cellular phone explained in FIG. 1 are generically called the memory part.

In this embodiment, a cellular phone user in a normal life space (activity range) sets a cellular phone 4 to a memory mode. The user stores as the normal life space the location information of a cell of a base station into the location information storage part 101 in the cellular phone 4. In other words, the activity range of the cellular phone user is stored. To prevent a cell (as a simple passage space) from being identified as the life space, the cellular phone 4 must stay in the same cell beyond the set time (in the case that the same base station is a contacted party). When the set time is exceeded, the identification information received from the base station is registered.

Upon completion of collection of the location information of the base stations in the memory mode, the cellular phone 108 is changed to a notification mode. In the notification mode, the cellular phone 108 judges to be in a cell out of the activity range to detect deviation from the normal activity range when an unregistered base station which is not registered into the location information storage part 101 of the memory part 109 is a contacted party.

At this time, the cellular phone 108 is changed to an alert mode. When the contacted party is the unregistered base station beyond the set time, the cellular phone 108 is changed to an emergency mode. After the change to the emergency mode, the cellular phone 108 automatically transmits, to a contact (mail address/phone number) registered into the contact storage part 102, a mail or voice phone including the registered contents (a message indicating abnormality of the activity range deviated from the normal activity range) and the identification information (location information) received from the base station at that time.

The specific operation of this embodiment will be described with reference to the flowchart shown in FIG. 3. At first, the operation for setting the cellular phone 108 to the memory mode and storing the location information of the normal activity range into the location information storage part 101 is described. Operating the operational part 107 sets the operation mode. By way of example, the case of a normal activity range in which the cellular phone user moves from home to a visiting place, as shown in FIG. 4, will be described.

Figure 3:
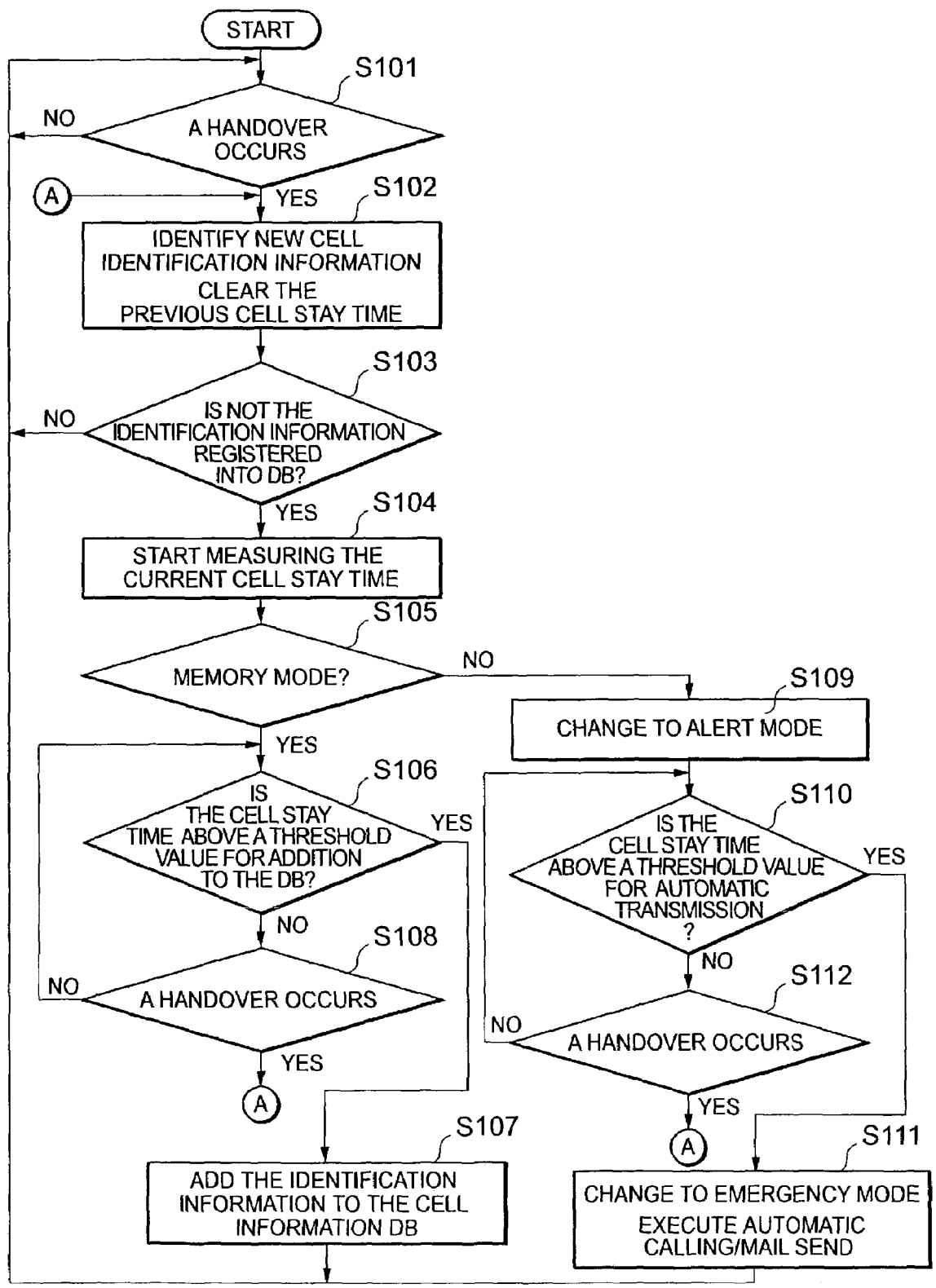
FIG. 3 is a flowchart for explaining the operation of the embodiment shown in FIG. 1.
Figure 4:
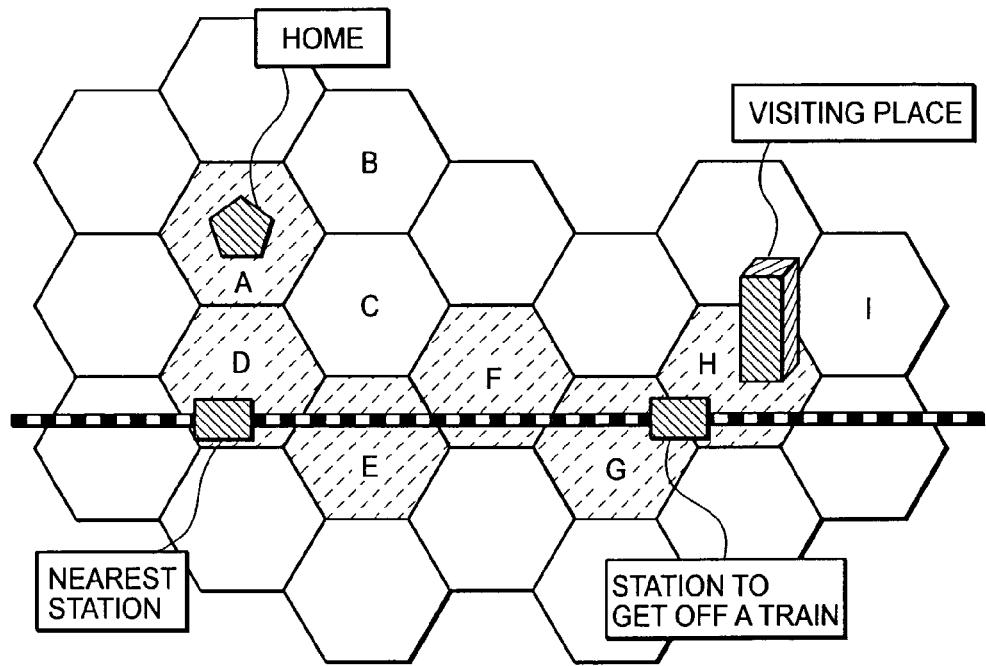
FIG. 4 is a diagram showing, together with a cell distribution, a route when a cellular phone user moves from home to a visiting place.

In FIG. 3, the cellular phone user staying at home turns on the cellular phone, and then, operates it by the operational part 107 to be set to the memory mode. At this time, a handover (switching of the base stations as a contacted party of the cellular phone) occurs (S101). Then, the control part 105 in the cellular phone identifies the identification information (location information) from new cell A to clear the stay time of the previous cell stored into the stay time storage part 103 (S102). In this case, since the memory mode has just started, the stay time of the previous cell is not stored into the stay time storage part 103 and the stay time of the previous cell need not be cleared.

It is determined whether or not the identification information from base station A is registered into the location information storage part 101 (S103). Since nothing is registered into the location information storage part 101 at this time, the routine is advanced to S104 so that the timer 104 is activated to start measuring the stay time of the current cell A (S104). It is next determined whether or not the operation mode of the cellular phone is the memory mode (S105). Since it is set to the memory mode at this time, the routine is advanced to S106. In S106, the measured value of the timer 104 is monitored to register the identification information from the base station A into the location information storage part 101 when the stay time of the current cell A is beyond the set time (S107). The process from S101 is performed again.

When a handover occurs in S108 before the measured value of the timer 104 reaches the set time in S106, the process from S102 is performed without registering the identification information from the base station A. When the stay time in the cell is shorter than the set time, the identification information from the base station is not registered so as not to identify it as the normal activity range, as described above.

When the cellular phone user leaves home to move to the nearest station and the cell A including his/her home is switched to cell D including the nearest station, a handover occurs (S101). At this time, the control part 105 in the cellular phone identifies the identification information from new cell D to clear the stay time of the previous cell A stored into the stay time storage part 103 (S102).

The timer 104 is activated to start measuring the stay time of the current cell D (S104) to judge whether the operation mode is the memory mode or not (S105). At this time, since it is the memory mode, the routine is advanced to S106. When the measured value of the timer 104 is beyond the set time, the identification information from base station D is registered into the location information storage part 101 (S107). In this case, the stay time in the cell D is beyond the set time and the identification information from the base station D is registered into the location information storage part 101.

The cellular phone user gets on a train at the nearest station of the cell D and passes through cells E and F to go to the station of cell G to get off the train. In this case, each time a handover occurs in the cells E, F and G (S101), the process of S101 to S108 of FIG. 3 is repeated. The stay time of the cells E and F is only a time during which the train passes. The identification information of the base stations of the cells E and F is registered and the identification information from the base station of the cell G including a station to get off the train is also registered.

When arriving at the nearest station, the cellular phone user goes to cell H including a visiting place. When a handover occurs in the cell H, the process of FIG. 3 is executed. In this case, the stay time in the cell H is longer than the set time and the identification information from the base station in the cell H is registered. In the memory mode, the identification information from the base stations is sequentially registered as the normal activity range of the cellular phone user into the location information storage part 101. The identification information from the base stations in the cells A, D, E, F, G and H is registered into the location information storage part 101.

The operation of the notification mode will be described. The cellular phone user switches the operation mode from the memory mode to the notification mode. In the notification mode, when the cellular phone user is in the normal activity range, that is, in the activity ranges (the cells A, D, E, F, G and H) registered into the location information storage part 101, the routine is advanced to S103 after the process of S101 and S102 of FIG. 3, a determination is made whether or not the identification information from the base station is registered. The routine is thus advanced to S101. In other words, in the normal registered cell, the process of S101 to S103 is repeated.

When the activity range of the cellular phone/cellular phone user is deviates from the registered cell, e.g., when he/she leaves home to go to the cell B in the opposite direction without going to the cell D including the nearest station, or when he/she leaves the cell H including a visiting place to go to the cell I in the opposite direction without going to the cell G including the nearest station, the identification information is determined to be unregistered in S103 after the process of S101 and S102. The routine is thus advanced to S104. The timer 104 is activated to start measuring the stay time of the current cell (for example, the cell B).

A determination is made whether the operation mode is the memory mode in S105. At this time, the operation mode set to the notification mode is changed to the alert mode (S109). When it is changed to the alert mode, the measured value of the timer 104 is monitored (S110). When the measured value of the timer 104 is beyond the set time, it is moved to the emergency mode.

In the emergency mode, the notification part 106 automatically notifies, by means of voice or mail, a message registered into the phone number or mail address registered into the contact storage part 102, e.g., a message notifying deviation from the normal activity range and the location information received from the base station of the current area (S111).

When a handover occurs in S112 before the measured value of the timer 104 reaches the set time in S110, the process from S102 is performed without change to the emergency mode. Depending on an electric wave state, particularly, in the case of stay in the corner of the cell, a handover may occur. Deviation from the activity range is not notified to avoid error notification.

When the cellular phone is moved to an untargeted area which makes communication impossible in the flowchart of FIG. 3, the base station as a contacted party of the cellular phone cannot be secured. In such a case, when the base station as a contacted party cannot be secured in a series of the process flow from S101 in the notification mode, the time is measured. When the notification mode is changed to the alert mode and the measured time elapses beyond the set time in S110, the alert mode is readily changed to the emergency mode in S111 for automatic transmission. This allows deviation from the activity range to be notified when the cellular phone is moved to the untargeted area.

In this embodiment, upon deviation from the registered cell, deviation from the activity range is notified automatically. The person who receives the notification can find that the cellular phone user is located in a cell different from the normal life space and can check whether he/she is safe or not by a return mail or phone. The location information from the base station in the current cell is notified at the same time. Therefore, it is possible to acquire the approximate location information on where the cellular phone user is located currently.

This embodiment automatically notifies that the cellular phone/cellular phone user is located in a cell different from the normal one. When an emergency state such as loss/stealing or kidnapping/missing is caused, a quick response can be made. The cellular phone of this embodiment is put in a bag or a car so that a quick response can be made when they are stolen.

The above embodiment uses the cell (the base station as a contacted party) as the unit of the activity range. In the case of a cell which can obtain a plurality of pieces of identification information in one cell (multi-zoned cell), the zone can be the unit in place of the cell.

In FIG. 3, in the case of stay in the unregistered cell beyond the set time, deviation from the activity range is transmitted automatically. The present invention is not limited to this. Specifically, there is calculated a time interval of handover occurrence or a moving speed of the cellular phone based on the size of the cell and the identification information obtained from the base station. Then, when the time interval is shorter than the set value and the moving speed exceeds the set value in S110, stay in the unregistered cell beyond the set time will not perform automatic transmission.

When moving at high speed by taxi or train, the cell may be the unregistered cell in the memory mode. In the case of stay in the unregistered cell beyond the set time, automatic transmission may not be performed. When there is no possibility of movement at high speed in the manner of a child walking to school, movement at high speed is abnormal. Whether the time interval is below the set value or not, or whether the moving speed is above the set value or not is judged in S110. When the time interval is below the set value or the moving speed is above the set value, automatic transmission is desirable.

In the case of stay in the unregistered cell beyond the set time, the cellular phone actively performs automatic transmission. It is also possible to passively transmit the current location information to the set destination by a trigger from outside. The cellular phone identifies the identification information from the base station of the cell at the current location constantly. The identification information is notified to indicate the current location. In this case, the trigger from outside refers to reception of phone/mail from a specified party or reception of a mail including specified information (specified character strings).

When the base station side or the cellular phone side can acquire more precise location information by GPS system, an absolute location such as latitude and longitude may be used in place of the location information of the base station. The judgment reference in change to the emergency mode can be changed from the cell unit to an absolute range (longitude and latitude/city, town and village).

To avoid malfunction, when movement to an unknown cell is previously found, the notification function for a deviation from the activity range can be released or it can be displayed in the alert mode. The cellular phone is described above as the target of the present invention, but the present invention can be also applied to PHS. When using PHS, the handled range (the size of a cell) of the base station thereof is typically smaller than that of the cellular phone. Notification of deviation from a smaller activity range and more precise location information can be notified.

Figure 5:
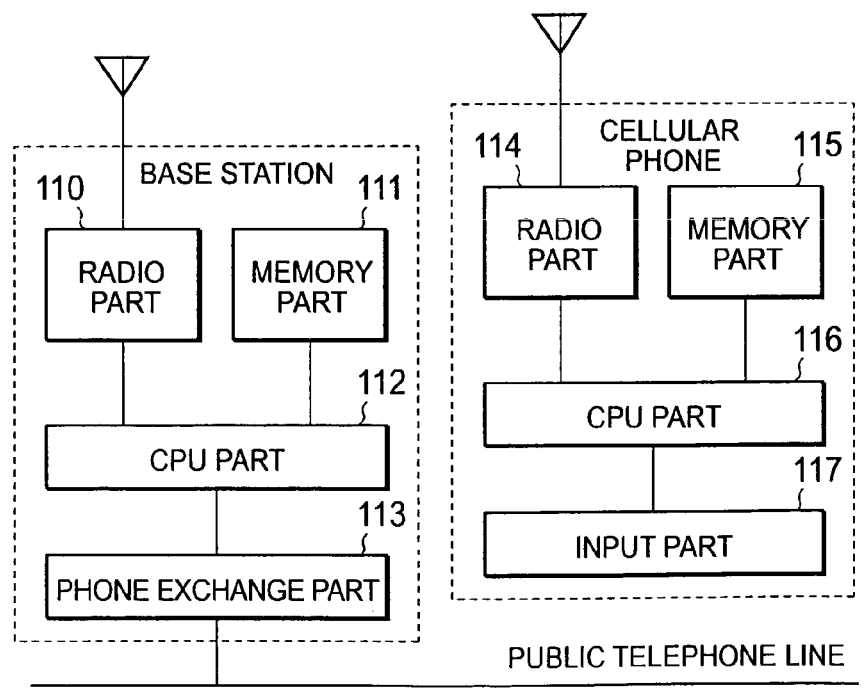
FIG. 5 is a diagram showing an embodiment of a mobile communication system according to the present invention.

An embodiment of a mobile communication system of the present invention will be described. FIG. 5 is a diagram showing the configuration of the mobile communication system of this embodiment. In the mobile communication system of this embodiment, when the activity range of a cellular phone/cellular phone user is deviated, the system side automatically notifies deviation from the activity range to a registered contact. In FIG. 5, a base station mainly has a radio part 110, a memory part 111, a CPU part 112 and a phone exchange part 113.

The memory part 111 is provided with an identification number storage part for registering an identification number (or a phone number) of a cellular phone notifying deviation from the activity range as described later. As shown in FIG. 2, the base station is arranged for each cell. The cellular phone has a radio part 114, a memory part 115, a CPU part 116, and an input part (operational part) 117.

The specific operation of this embodiment will be described with reference to the flowchart shown in FIG. 6. The operation for operating the cellular phone to be set to the memory mode and registering the location information of the normal activity range into the identification information storage part of the base station is described. The memory mode or the later-described notification mode, as the operation mode, is set using the setting function that the cellular phone has. For example, the case of a normal activity range in which the cellular phone user moves from home to a visiting place, as shown in FIG. 4 will be described.

Figure 6:
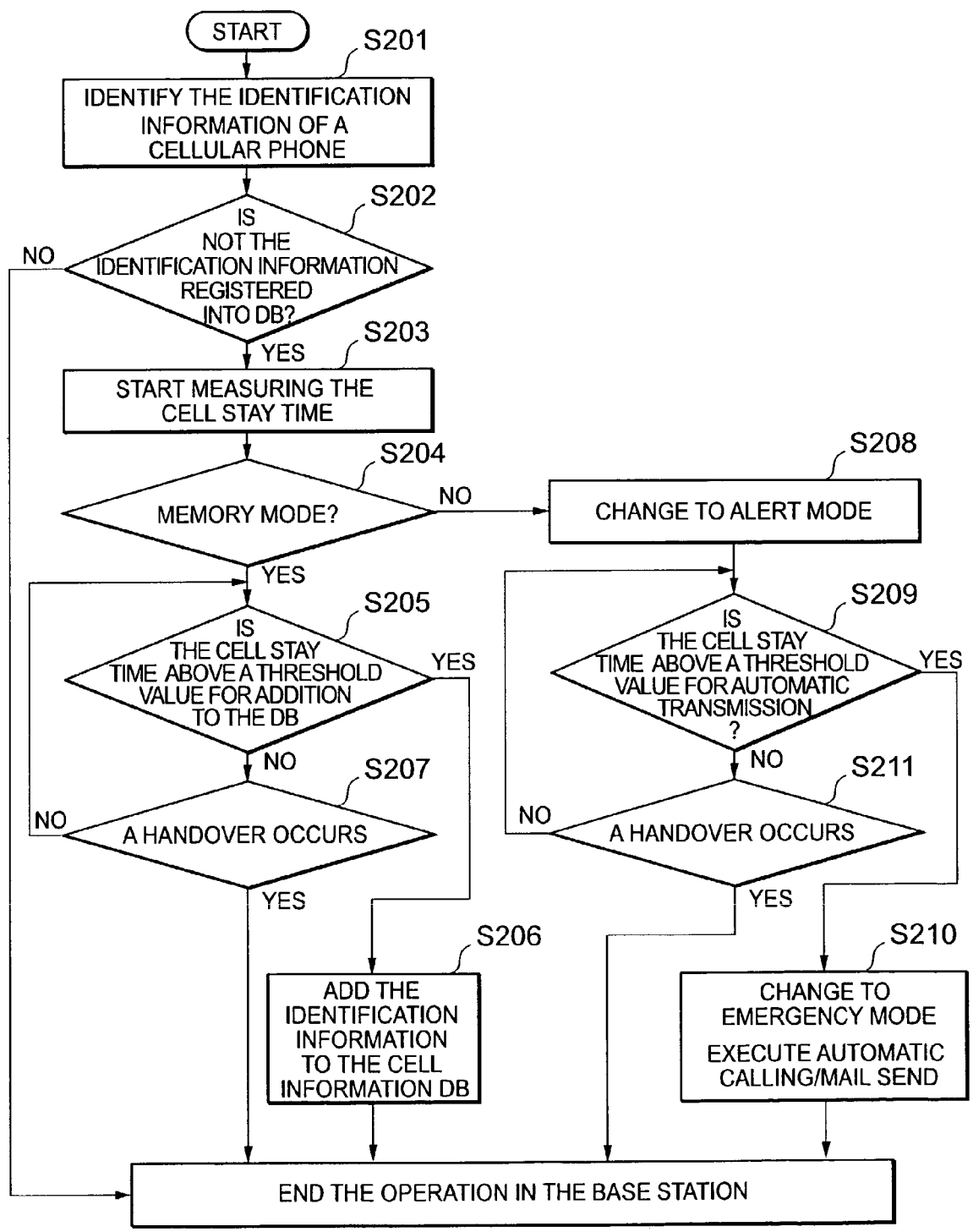
FIG. 6 is a flowchart for explaining the operation of the system shown in FIG. 5.

In FIG. 6, the cellular phone user staying at home turns on the cellular phone, and then, operates it by the operational part 107 to be set to the memory mode. At this time, the base station of cell A in which the cellular phone is located currently identifies the identification information of the cellular phone (S201). Then, the CPU part 112 in the base station determines whether the identification information is not registered into the identification information storage part (S202). In this case, since the memory mode has just started, the identification information is not registered.

When the identification information is not registered, the timer, not shown, in the base station is activated to start measuring the stay time of the current cell A (S203). A determination is made if the operation mode of the cellular phone is the memory mode (S204). Since it is set to the memory mode at this time, the routine is advanced to S205. In S205, the measured value of the timer is monitored to register the identification information from the cellular phone into the identification information storage part when the stay time of the current cell A is beyond the set time (S206). The process is then terminated.

When a handover occurs in S207 before the measured value of the timer reaches the set time in S205, the process is terminated without registering the identification information from the cellular phone. When the stay time in the cell is shorter than the set time, the identification information from the cellular phone is not registered so as not to identify it as the normal activity range, as described above. In this case, the identification information from the cellular phone is registered into the identification information storage part of the base station A.

When the cellular phone user leaves home to move to the nearest station, the base station of cell D including the nearest station identifies the identification information from the cellular phone (S201). Then, the CPU part 112 in the base station judges whether the identification information from the cellular phone is not registered into the identification information storage part (S202). In this case, the base station D judges that the identification information from the cellular phone is not registered, activating the timer to start measuring the stay time of the current cell D (S203).

Whether the operation mode is the memory mode or not is judged (S204). In this case, since it is the memory mode, the routine is advanced to S205. When the measured value of the timer is beyond the set time, the identification information from the cellular phone is registered into the identification information storage part of the base station D (S206). In this case, the stay time in the cell D is beyond the set time and the identification information from the cellular phone is registered into the identification information storage part of the base station D.

The cellular phone user gets on a train at the nearest station of the cell D and passes cells E and F to go to the station of cell G to get off the train. In this case, each time the base stations of the cells E, F and G identify the identification information from the cellular phone, the process of S201 to S207 of FIG. 6 is performed. The stay time of the cells E and F is only a time during which the train passes. The identification information from the cellular phone is registered into the base stations of the cells E and F and the identification information is also registered into the base station of the cell G including a station to get off the train.

When arriving at the nearest station, the cellular phone user goes to cell H including a visiting place. When the base station of the cell H identifies the identification information from the cellular phone, the process of FIG. 6 is executed. In this case, the stay time in the cell H is longer than the set time and the identification information from the cellular phone is registered into the base station in the cell H. In the memory mode, the identification information from the cellular phone is sequentially registered as the normal activity range of the cellular phone user into the identification information storage part of the base station. The identification information of the cellular phone is registered into the identification information storage part of the base stations of the cells A, D, E, F, G and H.

The operation of the notification mode will be described. In this case, the cellular phone user switches the operation mode from the memory mode to the notification mode. The notification mode is set using a function that the cellular phone has, as described above. In the notification mode, when the cellular phone user is in the normal activity range, that is, in the activity cells (the cells A, D, E, F, G and H) into which the identification information is registered and the routine is advanced to S202 after the process of S201 of FIG. 6, the identification information from the cellular phone is judged to be registered. The routine is thus terminated.

When the activity range of the cellular phone user is deviated from the registered cell, e.g., when he/she leaves home to go to the cell B in the opposite direction without going to the cell D including the nearest station, or when he/she leaves the cell H including a visiting place to go to the cell I in the opposite direction without going to the cell G including the nearest station, the identification information is judged to be unregistered in S202 after the process of S201. The routine is thus advanced to S203. The timer is activated to start measuring the stay time of the current cell (for example, the cell B).

Whether the operation mode is the memory mode or not is judged in S204. At this time, the operation mode set to the notification mode is changed to the alert mode (S208). When it is changed to the alert mode, the measured value of the timer is monitored (S209). When the measured value of the timer is beyond the set time, it is moved to the emergency mode.

In the emergency mode, the base station inquires the center exchange, not shown, to acquire the contact (phone number or mail address) of the cellular phone registered into the contact storage part, not shown, of the exchange, and then, automatically notifies to the contact, by means of voice or mail, a message notifying deviation from the normal activity range and the location information of the current base station (S210). The exchange side registers a contact for each cellular phone. The base station which registers the identification information of the cellular phone for the first time acquires the contact from the cellular phone to transmit it to the exchange for registration.

When a handover occurs in S211 before the measured value of the timer reaches the set time in S209, the process is terminated without change to the emergency mode. Depending on an electric wave state, particularly, in the case of stay in the corner of the cell, a handover may occur. Therefore, deviation from the activity range is not notified to avoid error notification.

In this embodiment, when the base station side identifies the identification information from the unregistered cellular phone, deviation from the activity range is notified automatically. The person who receives the notification can find that the cellular phone user is located in a cell different from the normal life space and can check whether he/she is safe or not by a return mail or phone. The location information from the base station in the current cell is notified at the same time. It is possible to acquire the approximate location information on where the cellular phone user is located currently.

This embodiment automatically notifies that the cellular phone and cellular phone user are located in a cell different from the normal one. When an emergency state such as loss/stealing or kidnapping/missing is caused, a quick response can be made. The cellular phone of this embodiment is put in a bag or a car so that a quick response can be made when they are stolen.

In FIG. 6, in the case of stay in the unregistered cell beyond the set time, deviation from the activity range is transmitted automatically. The present invention is not limited to this. There is calculated a time interval to identify the identification information between the base stations or a moving speed of the cellular phone based on the size of the cell or the identification information obtained from the cellular phone. Then, when the time interval is shorter than the set value and the moving speed exceeds the set value in S209, stay in the unregistered cell beyond the set time will not perform automatic transmission.

When moving at high speed by taxi or train, the cell may be the unregistered cell in the memory mode. In the case of stay in the unregistered cell beyond the set time, automatic transmission may not be performed. When there is no possibility of movement at high speed in the manner of a child walking to school, movement at high speed is abnormal. Whether the time interval is below the set value or not, or whether the moving speed is above the set value or not is judged in S209. When the time interval is below the set value or the moving speed is above the set value, automatic transmission is desirable.

In the case of stay in the unregistered cell beyond the set time, the base station actively performs automatic transmission. It is also possible to passively transmit the current location information to the set destination from the base station by a trigger from outside. This can indicate the current location of the cellular phone. The trigger from outside refers to reception of phone/mail from a specified party or reception of a mail including specified information (specified character strings).

To avoid malfunction, when movement to an unknown cell is previously found, the notification function for deviation from the activity range can be released or it can be displayed in the alert mode. The cellular phone is described above as the target of the present invention, but the present invention can be also applied to PHS. When using PHS, the handled range (the size of a cell) of the base station thereof is typically smaller than that of the cellular phone. Notification of deviation from a smaller activity range and more precise location information can be notified.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A mobile communication device, comprising:
    registering means for registering area information about a base station based on an operation by a user of said mobile communication device;
    storing means for storing information about a contact;
    judging means for judging whether or not said mobile communication device is in a registered area in said registering means;
    notifying means for notifying said contact about a deviation from said registered area when it is judged that said mobile communication device is not in said registered area and for sending current location information of said mobile communication device to said contact at the same time as notifying said contact about the deviation; and
    a calculating means for calculating a time interval during which a handover occurs between base stations,
    wherein said notifying means notifies said contact about a deviation from said registered area when said time interval is over a predetermined time, and said notifying means does not notify said contact about a deviation from said registered area when said time interval is below a predetermined time.

2. A mobile communication device, comprising:
    registering means for registering area information about a base station based on an operation by a user of said mobile communication device;
    storing means for storing information about a contact;
    judging means for judging whether or not said mobile communication device is in a registered area in said registering means;
    notifying means for notifying said contact about a deviation from said registered area when it is judged that said mobile communication device is not in said registered area and for sending current location information of said mobile communication device to said contact at the same time as notifying said contact about the deviation; and a calculating means for calculating a moving speed based on a size of the area and location information from the base station, wherein said notifying means notifies said contact about a deviation from said registered area when said moving speed is over a predetermined speed, and said notifying means does not notify said contact about a deviation from said registered area when said moving speed is below a predetermined speed.

3. A mobile communication device, comprising:

a registering circuit that registers area information about a base station based on an operation by a user of said mobile communication device;

a storing circuit that stores information about a contact;

a judging circuit that judges whether or not said mobile communication device is in a registered area in said registering circuit;

a notifying circuit that notifies said contact about a deviation from said registered area when it is judged that said mobile communication device is not in said registered area and for sending current location information of said mobile communication device to said contact at the same time as notifying said contact about the deviation; and a calculator that calculates a time interval during which a handover occurs between base stations, wherein said notifying circuit notifies said contact about the deviation from said registered area when said time interval is over a predetermined time, and said notifying circuit does not notify said contact about a deviation from said registered area when said time interval is below a predetermined time.

4. A mobile communication device, comprising:

a registering circuit that registers area information about a base station based on an operation by a user of said mobile communication device;

a storing circuit that stores information about a contact;

a judging circuit that judges whether or not said mobile communication device is in a registered area in said registering circuit;

a notifying circuit that notifies said contact about a deviation from said registered area when it is judged that said mobile communication device is not in said registered area and for sending current location information of said mobile communication device to said contact at the same time as notifying said contact about the deviation; and a calculator that calculates a moving speed based on a size of said registered area and location information from the base station, wherein said notifying circuit notifies said contact about the deviation from said registered area when said moving speed is over a predetermined speed, and said notifying circuit does not notify said contact about a deviation from said registered area when said moving speed is below a predetermined speed.

* * * * *